United States Patent [19]

Grandel

[11] 4,366,996
[45] Jan. 4, 1983

[54] NEEDLE BEARING WEAR REDUCTION ARRANGEMENT

[75] Inventor: Leonard F. Grandel, Saginaw, Mich.

[73] Assignee: General Motors Corporation, Detroit, Mich.

[21] Appl. No.: 257,739

[22] Filed: Apr. 27, 1981

[51] Int. Cl.³ .................. F16C 33/30; F16C 35/04
[52] U.S. Cl. .......................... 308/187; 308/207 R; 464/11; 464/132
[58] Field of Search .............. 464/132, 127, 128, 131, 464/133, 11, 14; 308/207 R, 187, 210, 212, 78, 90

[56] References Cited

U.S. PATENT DOCUMENTS

| | | | |
|---|---|---|---|
| 2,276,301 | 3/1942 | Gregory | 308/207 R |
| 2,540,548 | 2/1951 | Rolph | 308/207 R |
| 3,501,209 | 3/1970 | Ende | 308/207 R |
| 4,067,626 | 1/1978 | McElwain | 464/132 X |
| 4,103,512 | 8/1978 | McElwain et al. | 464/14 |
| 4,130,325 | 12/1978 | Schultenkamper | 464/131 X |

FOREIGN PATENT DOCUMENTS 471480  8/1975  U.S.S.R. .................. 308/78

Primary Examiner—Stuart S. Levy
Assistant Examiner—Daniel P. Stodola
Attorney, Agent, or Firm—Patrick M. Griffin

[57] ABSTRACT

A needle bearing wear reduction arrangement for causing a series of needle bearings to positively circumferentially migrate in the annular space between a trunnion and a bearing cup. A free floating washer has a series of radially extending circumferentially spaced serrations on the washer face proximate one of the ends of the needle bearings. During relative movement between the trunnion and bearing cup, the lubricant flow in the annular space causes the washer face to intermittently engage the ends of the needle bearings and one or more of the serrations pick up and move one or more of the needle bearings circumferentially between the trunnion and bearing cup. The serrations are spaced differently than the circumferential spacing of the needle bearings to ensure that the washer will not ride with all of the needle bearings.

2 Claims, 4 Drawing Figures

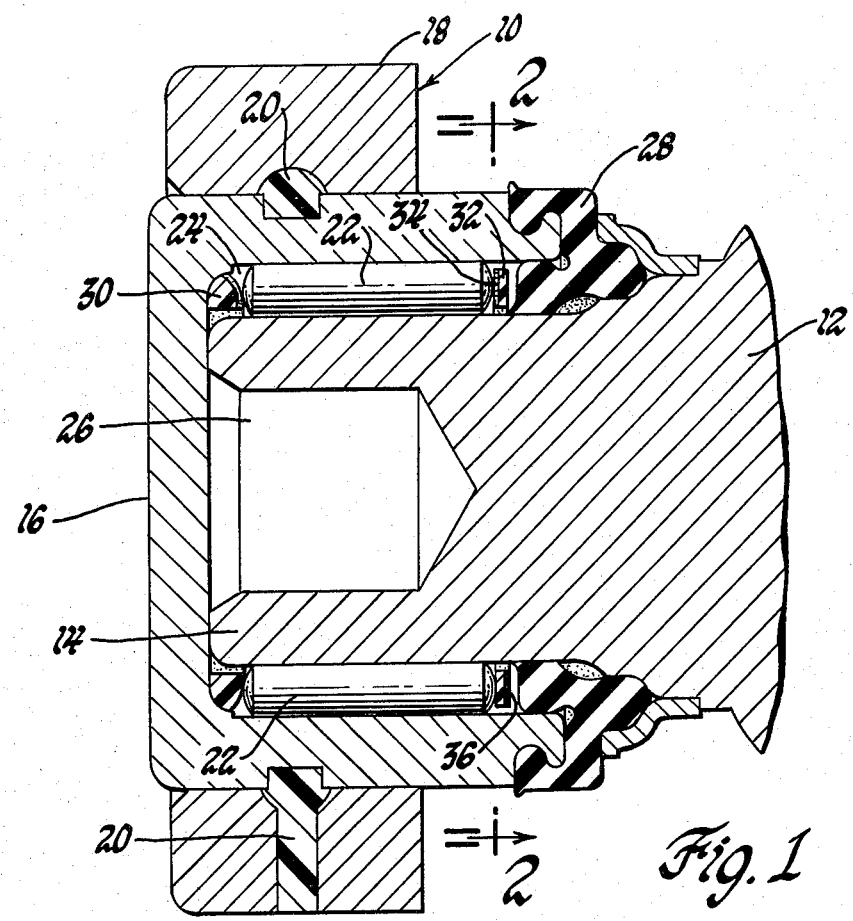
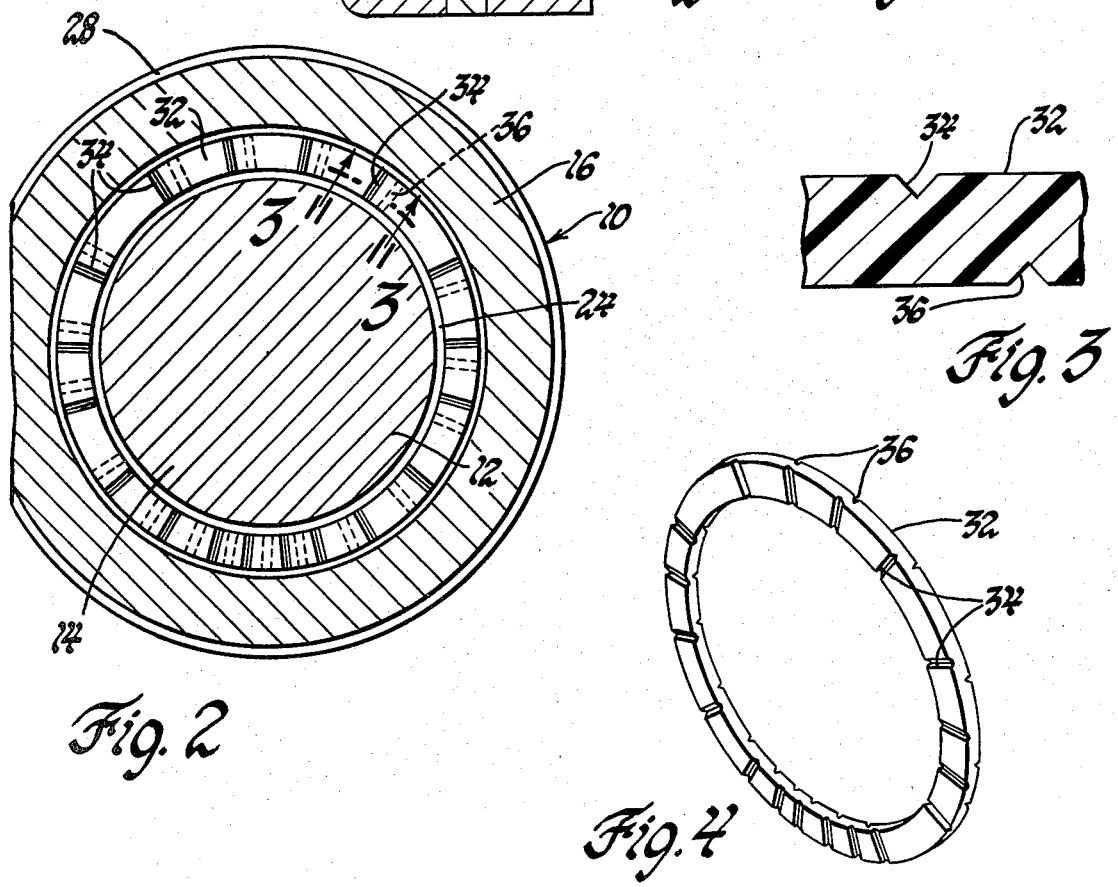

NEEDLE BEARING WEAR REDUCTION ARRANGEMENT

BACKGROUND OF THE INVENTION

This invention relates generally to needle bearings for rotatably supporting the end of a shaft in a bearing cup and specifically to a wear reduction arrangement which causes the needle bearings to positively circumferentially migrate with respect to the shaft and bearing cup to avoid excessive wear.

In the typical Cardan type composite universal joint, a generally cross-shaped spider includes four legs or trunnions each of which is rotatably supported in a bearing cup by a series of needle bearings circumferentially spaced therearound. The bearing cups are arranged in two axially aligned pairs, each pair included on one of a pair of 90° displaced yoke members. Each yoke member is in turn mounted to a shaft member. Typically, each bearing cup includes a pair of washers which float freely in a lubricant contained therein, each washer being proximate to the ends of the circumferentially spaced needle bearings. Each trunnion generally rotates within the cup over an arc of only one or two degrees. As a consequence, each needle bearing has a fairly constant center of oscillation with respect to the trunnion and the bearing cup which leads to excessive wear or brinneling thereof. It is, therefore, desirable to positively induce a circumferential migration of the needle bearings to randomly vary the centers of oscillation thereof.

Prior art devices designed to induce migration of the bearings generally include one or more ring members which are continually biased against the ends of the needle bearings, placing a continuous axial load thereon. During torque variations in the operation of the joint, a slight braking effect on the needle bearings occurs, causing a change in the center of oscillation thereof. Besides involving elements not normally found in the universal joint, such structures involve obvious problems of increased friction and wear on the ends of the needle bearings.

SUMMARY OF THE INVENTION

The arrangement of the subject invention is specifically intended for use in such a Cardan type joint or in any other application where the above described excessive localized wear is a problem. The arrangement causes the circumferentially spaced needle bearings to migrate with respect to the trunnion and bearing cup as the trunnion rotates back and forth therein, thus serving to vary the center of oscillation of the bearings in a random fashion and eliminate localized wear.

In the preferred embodiment, which is disclosed in combination with a Cardan type joint, at least one of the washers contains thereon a series of radially directed, circumferentially spaced grooves or serrations on the side of the washer facing the rounded ends of the needle bearings. The circumferential spacing of these grooves is such that it is not physically possible for all the grooves to be aligned with all of the ends of the needle bearings at the same time.

During operation of the universal joint, the washers float freely in a lubricant contained in the annular space between the trunnion and bearing cup. The turbulent flow of the lubricant causes the washers to randomly move both radially and slightly axially of the bearing cup. This serves to bring one or more of the grooves of the washer into random contact with one or more of the ends of the needle bearings. As the washer subsequently moves the contacted needle bearings will be slightly moved or "kicked" thereby. This action causes a random migration of the contacted needle bearings circumferentially with respect to the trunnion and bearing cup to change the center of oscillation of the contacted needle bearings and to avoid the described wear problem. Since the circumferential spacing of the grooves is different from that of the needle bearings, the washer will not simply "ride" with the needle bearings with all of the grooves in contact with all of the ends of the needle bearings.

One feature of the present invention is that it provides an improved wear reduction arrangement to cause a random migration of needle bearings relative to a rotatably interconnected shaft and bearing cup to avoid excessive wear or brinneling.

Another feature of the invention is that the needle bearing migration is obtained by the intermittent, random contact of a member with the ends of one or more of the needle bearings to cause them to move slightly circumferentially with respect to the shaft and bearing cup.

Yet another feature of the invention is that the member is a washer which is circumferentially serrated on the side thereof which is respective to the ends of the needle bearings.

BRIEF DESCRIPTION OF THE DRAWINGS

These and other features will be apparent from the following description and drawing wherein:

FIG. 1 is a sectional view of a portion of a Cardan type universal joint having a spider leg and a bearing cup rotatably interconnected by a needle bearing arrangement according to this invention;

FIG. 2 is a sectional view taken generally along the plane indicated by line 2—2 of FIG. 1;

FIG. 3 is an enlarged partial sectional view taken generally along the plane indicated by line 3—3 of FIG. 2; and FIG. 4 is a perspective view of a washer.

DESCRIPTION OF THE PREFERRED EMBODIMENT

Referring first to FIGS. 1 and 2, a conventional universal joint known as a Cardan universal joint 10 includes a cross-shaped member known as a spider 12 which has four legs or trunnions 14, each of which is respective to a bearing cup 16. The bearing cups are arranged in two axially aligned pairs, each pair of bearing cups 16 being joined to a pair of yoke members 18, one of which is visible in cross-section in FIG. 1, by a plastic injection 20 or some other suitable means. Yoke members 18 are displaced 90° with respect to one another, and one is attached to a drive and one to a driven shaft, not shown, in conventional fashion. Each trunnion 14 is rotatably supported within its bearing cup 16 by a series of circumferentially spaced needle bearings 22 located in the annular space 24 between trunnion 14 and the inside wall of bearing cup 16. Each trunnion 14 includes a lubricant reservoir 26 which stores a lubricant which fills annular space 24. Conventional seal 28 seals annular space 24 to prevent the escape of lubricant.

A pair of washers 30 and 32 are located in annular space 24, each respective to the ends of needle bearings 22. Washer 30 is known as the bearing washer as it prevents the one ends of needle bearings 22 from contacting and wearing on the bottom wall of bearing cup 16. Washer 32 is known as the seal washer as it likewise prevents the opposite or other ends of bearings 22 from contacting seal 28. Washers 30 and 32 are conventionally formed of plastic and each floats freely in the lubricant filling annular space 24.

Referring now to FIGS. 2, 3 and 4, the invention is disclosed as applied to seal washer 32, although it can be applied to either or both of the washers 30, 32. A series of radially extending serrations or grooves 34 is formed in the one face of the washer proximate the rounded one ends of the needle bearings 22. Identical serrations or grooves 36 may be formed in the other face to obviate the necessity of distinguishing one face from the other during assembly. In that event, as seen in FIG. 3, serrations 34 and 36 are offset slightly from one another to avoid weakening washer 32. Serrations 34 are circumferentially spaced around washer 32 differently than the circumferential spacing of needle bearings 22 around trunnion 14. Thus, it is physically impossible for all serrations 34 to simultaneously contact the one ends of all of the needle bearings 22. This spacing is visible in both FIGS. 2 and 4. This different circumferential spacing assures the operation of the washer as will be described.

During operation of the univeral joint 10, trunnions 14 rapidly rotate back and forth within bearing cup 16 through an arc of one or two degrees. The needle bearings 22 thus normally oscillate about relatively fixed axes. The lubricant in annular space 24 flows turbulently and randomly moves washers 30 and 32 circumferentially, radially, and axially in annular space 24. This movement of washer 32 serves to bring one or more serrations 34 into random contact with the rounded ends of one or more of the needle bearings 22 to slightly "kick" or move the contacted needle bearings circumferentially within annular space 24. Because of the close packing of needle bearings 22, this movement will cause the entire series of needle bearings 22 to migrate with respect to trunnion 14 and bearing cup 16, thereby changing the centers of oscillation thereof. Because of the described circumferential spacing of serrations 34 and 36, washer 22 will not simply "ride" back and forth with the oscillating needle bearings 22 with all serrations in contact with the ends of all of the needle bearings at the same time. Thus, the movement of needle bearings 22 will be random and intermittent and the wear will be randomly and evenly distributed. If desired, both washers 30 and 32 could be provided with serrations, thus increasing the probability of contact of the ends of needle bearings 22 therewith.

The wear reduction arrangement of this invention includes only structural elements already present in universal joints and is easily accomplished by the addition of serrations or grooves to at least one of the faces of one of the washers. It should be understood that the invention is applicable as well to any structure wherein a shaft member is rotatably supported in a journal by a series of needle bearings and it is desired to avoid the brinelling or excessive wear.

The embodiments of the invention in which an exclusive property or privilege is claimed are defined as follows:

1. In combination with a pair of annular members rotatably supported respective to one another by a series of circumferentially spaced needle bearings arranged in an annular space between said members, said annular space being sealed and filled with a lubricant, a wear reduction arrangement for inducing circumferential migration of the needle bearings, comprising, a free-floating annular member contained in the lubricant in the annular space proximate one of the ends of the needle bearings, the free floating member being moved within the annular space by the lubricant during relative rotation of the annular members, the free floating member including a series of radially extending grooves spaced circumferentially therearound, the circumferential spacing of the grooves being different than the circumferential spacing of the one ends of the needle bearings, a number of said grooves being intermittently engageable with a number of the one ends of the needle bearings during relative rotation of the annular members to randomly cause such needle bearings to migrate with respect to the annular members.

2. In combination with a universal joint of the type including a trunnion rotatably supported within a bearing cup by a series of needle bearings circumferentially arranged in an annular space between the trunnion and inside wall of the bearing cup, the annular space being sealed and filled with a lubricant, and further including a free floating annular washer in the annular space which has at least one facelocated proximate the ends of the needle bearings, the washer being movable circumferentially and axially of the trunnion and cup by the lubricant during operation of the joint to intermittently engage the washer face with the ends of the needle bearings, the improvement comprising, a series of radially directed circumferentially spaced grooves formed on the one face of the annular washer, the circumferential spacing of the grooves being different than that of the needle bearings, at least one of the grooves engaging one of the ends of the needle bearing during intermittent engagement of the washer and needle bearings to circumferentially move at least one needle bearing and cause a random migration of all of the needle bearings with respect to the trunnion and bearing cup.

* * * * *